United States Patent
Hart et al.

(10) Patent No.: US 6,775,785 B1
(45) Date of Patent: Aug. 10, 2004

(54) METHOD AND APPARATUS FOR ACCESS TO RESOURCES NOT MAPPED TO AN AUTONOMOUS SUBSYSTEM IN A COMPUTER BASED SYSTEM WITHOUT INVOLVEMENT OF THE MAIN OPERATING SYSTEM

(75) Inventors: Frank P. Hart, Apex, NC (US); Edward J. Pole, Hillsboro, OR (US); Siripong Sritanyaratana, Union City, CA (US)

(73) Assignee: Intel Corporation, Santa Clara, CA (US)

( * ) Notice: Subject to any disclaimer, the term of this patent is extended or adjusted under 35 U.S.C. 154(b) by 510 days.

(21) Appl. No.: 09/675,493

(22) Filed: Sep. 29, 2000

(51) Int. Cl.[7] .................................................. G06F 1/26
(52) U.S. Cl. ........................................ 713/323; 709/104
(58) Field of Search ................................. 713/300, 310, 713/323, 324, 320, 1, 2; 709/100, 104, 226

(56) References Cited

U.S. PATENT DOCUMENTS 5,083,266 A * 1/1992 Watanabe .................... 713/601
6,266,714 B1 * 7/2001 Jacobs et al. ................. 710/14
6,301,297 B1 * 10/2001 Russo ......................... 375/222

OTHER PUBLICATIONS

"Advanced Configuration and Power Interface Specification," Compaq Computer Corporation, Intel Corporation, Microsoft Corporation, Phoenix Technologies Ltd. And Toshiba Corporation, Revision 2.0, Jul. 27, 2000, 52 pages.

* cited by examiner

*Primary Examiner*—A. Elamin
*Assistant Examiner*—Thuan Du
(74) *Attorney, Agent, or Firm*—Blakely, Sokoloff, Taylor & Zafman LLP

(57) ABSTRACT

A method and apparatus for access to resources not mapped to an autonomous subsystem in a computer based system without involvement of the main operating system are described.

20 Claims, 5 Drawing Sheets

METHOD AND APPARATUS FOR ACCESS TO RESOURCES NOT MAPPED TO AN AUTONOMOUS SUBSYSTEM IN A COMPUTER BASED SYSTEM WITHOUT INVOLVEMENT OF THE MAIN OPERATING SYSTEM

FIELD OF THE INVENTION

The present invention pertains to the field of computers. More particularly, the present invention relates to accessing resources not mapped to a subsystem in a computer based system without involvement of the main operating system.

BACKGROUND OF THE INVENTION

Computer based systems are becoming more mobile. This mobility often places an emphasis on usability. Usability is often extended by the ability to operate the equipment for longer periods of time. This time period is often related to the power consumption of the equipment, particularly in battery operated equipment. Thus, high power consumption may pose problems.

Numerous approaches to reducing power consumption have been tried. Powering off equipment when not in active use is one approach. Other approaches involve putting equipment in various lower power states, such as, idle mode, sleep mode, hibernation mode, etc. Such approaches may involve turning off portions of circuits or components, powering down subsystems and/or the main system, lowering supply voltages, altering clocking mechanisms, transferring data from, for example, random access memory (RAM) to disk storage, etc.

One such approach to conserve power consumption is to have the host or main central processing unit (CPU) powered down while having a subsystem active. The subsystem may need to transfer information for which the host CPU upon exiting a powered down state boots up the operating system, performs the transfer, and then powers down. Time required to boot up the operating system may present a problem for a subsystem that needs a rapid response. Power consumed during the boot up process may also present a problem for battery operated equipment.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
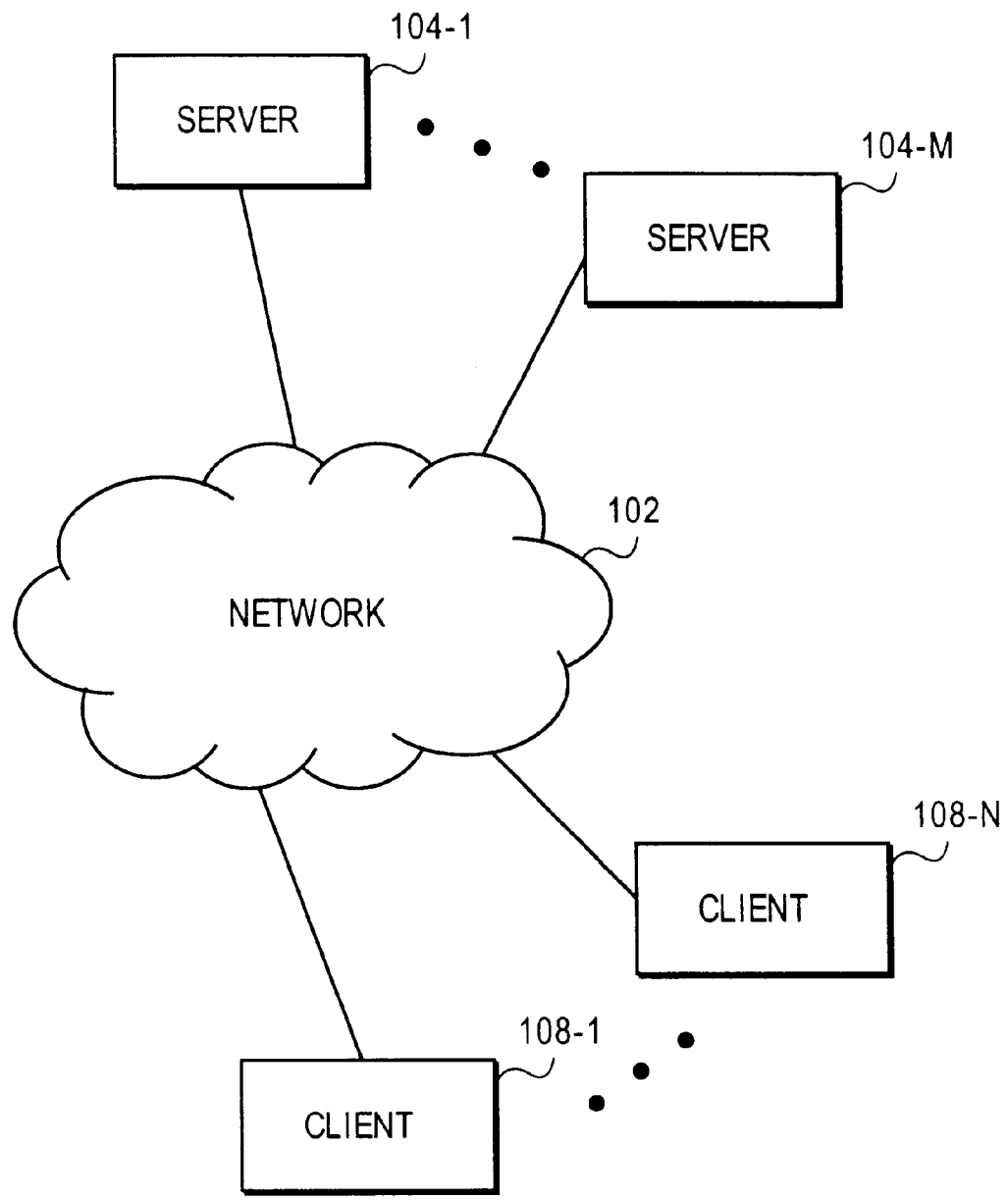
FIG. 1 illustrates a networked computer environment.

A method and apparatus for access to resources not mapped to an autonomous subsystem in a computer based system without involvement of the main operating system are described. For purposes of discussing the invention, it is to be understood that various terms are used by those knowledgeable in the art to describe techniques by which resources within a system may be accessible to other resources within the system. For example, the word mapping is an operation that is to be understood to allow one resource to have access to another resource. An example of mapping, may be, but is not limited to, transferring information from, for example, a subsystem to a main system such that the main system may now access the information. That is, the transferring of information is to be understood to be a possible subset of accessing information. For example, in a computer system, a hard disk drive may have information that the main processor would like to access, for perhaps updating. The main processor does not have direct access to the information on the disk, but may request that it be mapped or transferred into main memory where the main processor can directly access and modify the information before perhaps, transferring the modified information back to the hard disk drive.

Additionally any mechanism that provides the functionality as described above may be considered equivalent to mapping. This may include, but is not limited to enabling addressing and data transfer modes in devices such as memory controller or input/output controllers, address translation, special addressing or signaling modes, memory offsets, interrupts allowing access, vectoring of a processor to resources, etc.

A computer-based system may be composed of many components, which for convenience of description and functionality, are often described as a main system and possibly multiple subsystems. For example, in a personal computer there is a main processor which executes most of the applications and often to run or execute the applications must run a main operating system such as the Windows® operating system or the Linux® operating system. Subsystems in a personal computer, for example, may include, but are not limited to, the keyboard, the sound system, the graphics, etc.

The power or energy consuming state of a device, such as a microprocessor or central processing unit (CPU), is to be understood as having a continuum of power ranges for operation, such as, fully awake, idle mode, sleep mode, hibernation mode, fully off, etc. These different power states may be invoked and/or maintained by mechanisms such as control lines, commands, frequency control, voltage control, current control, etc.

Communications between a main system and its resources and a subsystem and its resources may be effected by, for example, but is not limited to, a wired bus, wireless means (such as optical, RF, etc.), etc. The communication contents may include, but is not limited to, commands, data, software code, signals, messages, information, interrupts, etc.

Booting, to boot a system or CPU, boot up, or bootup, is to be understood as a mechanism where a resource, such as a CPU, fetches and/or acquires additional information in response to a stimulus, such as a power on command. The booting process is understood, after successfully completed, to allow a resource to execute high level applications and/or an operating system. It is also understood that during the bootup process, for example, a CPU may execute code and processes considered lower level, which are nonetheless capable of configuring and performing tasks.

A machine-readable medium is understood to include any mechanism for storing or transmitting information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

FIG. 1 illustrates a network environment in which the techniques described may be applied. As shown, several computer systems in the form of M servers 104-1 through 104-M and N clients 108-1 through 108-N are connected to each other via a network, which may be, for example, the Internet. Note that alternatively the network 102 might be or include one or more of: a Local Area Network (LAN), Wide Area Network (WAN), satellite link, fiber network, cable network, or a combination of these and/or others. The method and apparatus described herein may be applied to essentially any type of communicating means or device whether local or remote, such as a LAN, a WAN, a system bus, a disk drive, storage, etc.

Figure 2:
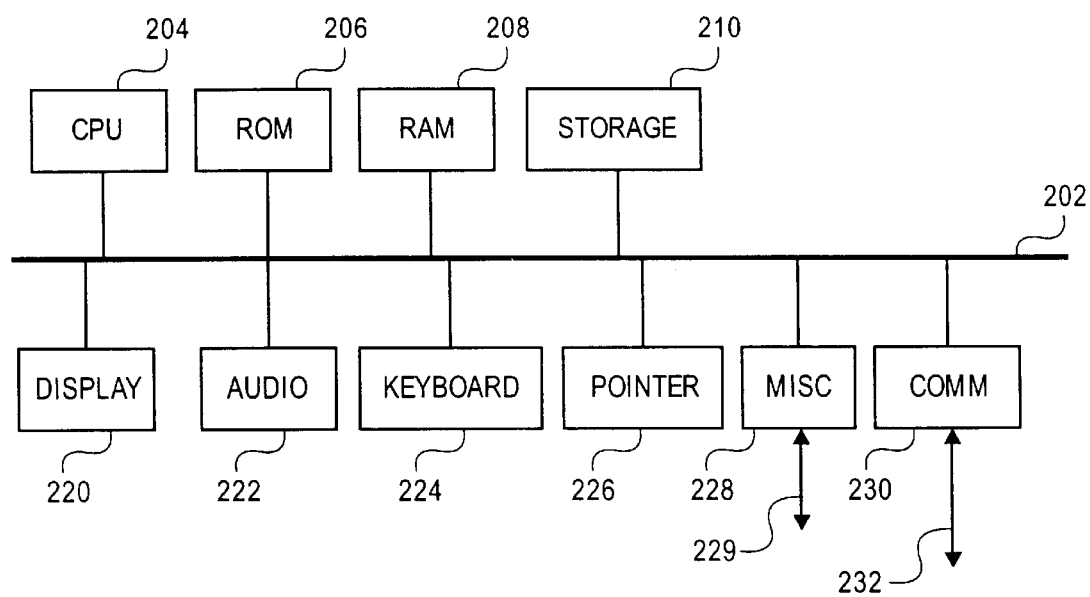
FIG. 2 is a block diagram of a computer system.

FIG. 2 illustrates a conventional personal computer in block diagram form, which may be representative of any of the clients and servers shown in FIG. 1. The block diagram is a high level conceptual representation and may be implemented in a variety of ways and by various architectures. Bus system 202 interconnects a Central Processing Unit (CPU) 204, Read Only Memory (ROM) 206, Random Access Memory (RAM) 208, storage 210, display 220, audio, 222, keyboard 224, pointer 226, miscellaneous input/output (I/O) devices 228, and communications 230. The bus system 202 may be for example, one or more of such buses as a system bus, Peripheral Component Interconnect (PCI), Advanced Graphics Port (AGP), Small Computer System Interface (SCSI), Institute of Electrical and Electronics Engineers (IEEE) standard number 1394 (FireWire), etc. The CPU 204 may be a single, multiple, or even a distributed computing resource. The ROM 206 may be any type of non-volatile memory, which may be programmable such as, mask programmable, flash, etc. RAM 208 may be, for example, static, dynamic, synchronous, asynchronous, or any combination. Storage 210, may be Compact Disc (CD), Digital Versatile Disk (DVD), hard disks, optical disks, tape, flash, memory sticks, video recorders, etc. Display 220 might be, for example, a Cathode Ray Tube (CRT), Liquid Crystal Display (LCD), a projection system, Television (TV), etc. Audio 222 may be a monophonic, stereo, three dimensional sound card, etc. The keyboard 224 may be a keyboard, a musical keyboard, a keypad, a series of switches, etc. The pointer 226, may be, for example, a mouse, a touchpad, a trackball, joystick, etc. I/O devices 228, might be a voice command input device, a thumbprint input device, a smart card slot, a Personal Computer Card (PC Card) interface, virtual reality accessories, etc., which may optionally connect via an input/output port 229 to other devices or systems. An example of a miscellaneous I/O device 228 would be a Musical Instrument Digital Interface (MIDI) card with the I/O port 229 connecting to the musical instrument(s). Communications device 230 might be, for example, an Ethernet adapter for local area network (LAN) connections, a satellite connection, a settop box adapter, a Digital Subscriber Line (xDSL) adapter, a wireless modem, a conventional telephone modem, a direct telephone connection, a Hybrid-Fiber Coax (HFC) connection, cable modem, etc. The external connection port 232 may provide for any interconnection, as needed, between a remote device and the bus system 202 through the communications device 230. For example, the communications device 230 might be an Ethernet adapter, which is connected via the connection port 232 to, for example, an external DSL modem. Note that depending upon the actual implementation of a computer system, the computer system may include some, all, more, or a rearrangement of components in the block diagram. For example, a thin client might consist of a wireless hand held device that lacks, for example, a traditional keyboard. Thus, many variations on the system of FIG. 2 are possible.

Referring back to FIG. 1, clients 108-1 through 108-N are effectively connected to web sites, application service providers, search engines, and/or database resources represented by servers, such as servers 104-1 through 104-M, via the network 102. The web browser and/or other applications are generally running on the clients 108-1 through 108-N, while information generally resides on the servers 104-1 through 104-M. For ease of explanation, a single client 108-1 will be considered to illustrate one embodiment of the present techniques. It will be readily apparent that such techniques can be easily applied to multiple clients.

In FIG. 1, the client 108-1 may be running software code that has the capability to access the network. This capability would allow accessing another system or subsystem for any possible updates thereto from a server via the Internet and/or other network. A description of the method of updating or installation of any revised subsystem code and/or data is not necessary for an understanding of the present invention.

The information required for executing the code from a subsystem, in the present invention may, but is not limited to, embodiment in the CPU 204, the ROM 206, the Storage 210, the Communications device 230, etc. This subsystem information may consist of, but is not limited to, subsystem boot indicators, actual boot code and/or data for booting a subsystem, interrupt service routines, power sequencing, transferring information, setting up direct memory access (DMA), etc. Additionally, accesses through, for example, the Communications device 230 which might be, for example, an Ethernet adapter would allow access to a network wherein the information such as a subsystem code and/or information may be retrieved.

A subsystem may be, but is not limited to, one or more of the elements of FIG. 2. For example, Storage 210 may have a subsystem that handles how data is to be stored and retrieved. Audio 222 may have a subsystem that handles when to, for example, power down speakers. Communications device 230 may, for example, have a subsystem that needs to transfer information to the Storage 210 without using the main operating system upon receiving a message.

Figure 3:
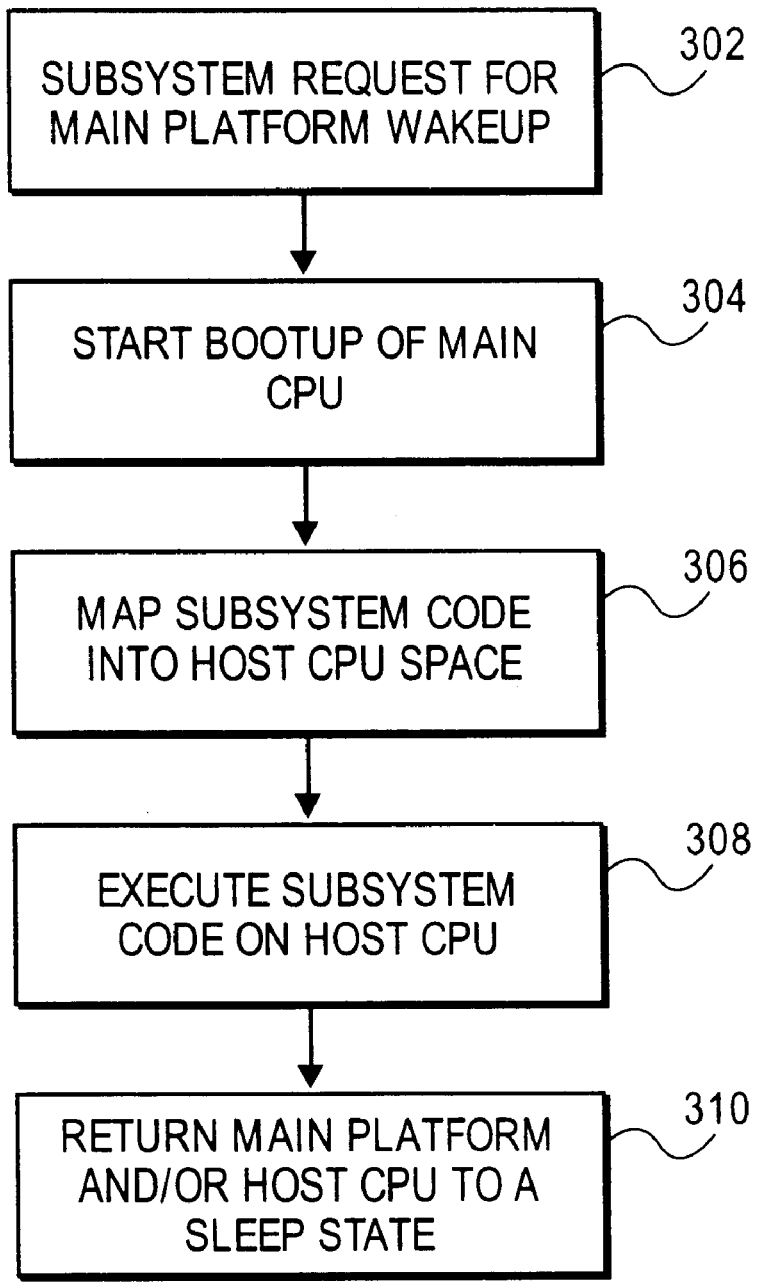
FIGS. 3, and 4 are flow diagrams illustrating various embodiments of the invention.

FIG. 3 is a high level flow diagram of one embodiment of the present invention. A subsystem request for main platform wakeup 302 is received and starts bootup of the main CPU 304. During this bootup of the main CPU, code is executed that maps subsystem code into the host CPU space 306. The host CPU then executes the subsystem code on the host CPU 308. After execution of the subsystem code on the host CPU 308, the main platform and/or the host CPU is returned to a sleep state 310. The mapping of subsystem resources and code as explained above, allows the host CPU access to the subsystem resources and/or code. This mapping, for example, may place the code located within a subsystem within the memory address space of the host CPU, thus allowing the host CPU to execute the code.

Figure 4:
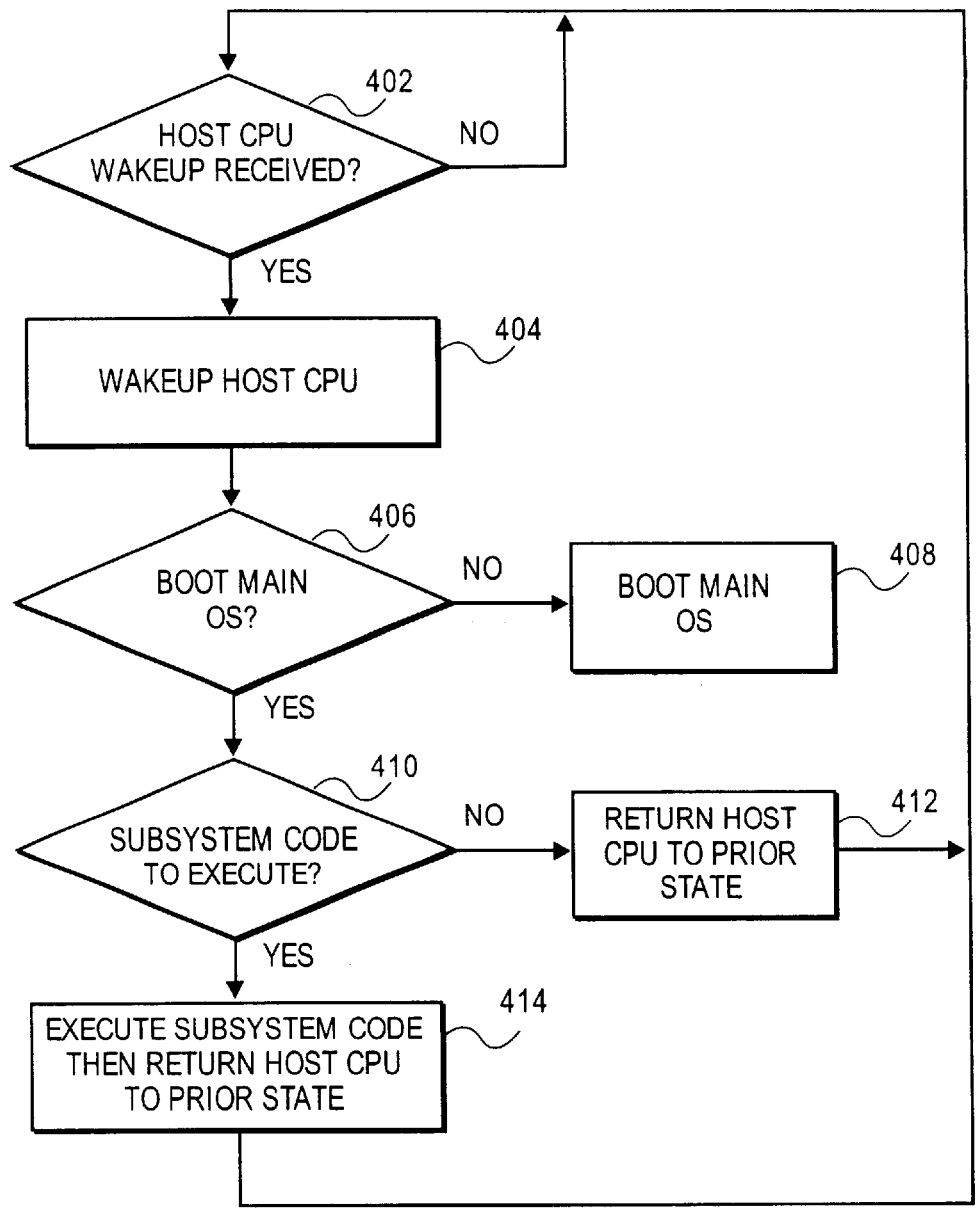

FIG. 4 illustrates another embodiment of the present invention. It also illustrates how the host CPU may access the subsystem resources without the use of a main operating system. Assume that the operations as depicted in FIG. 3 have been performed and the host CPU is now powered down, power down host CPU 308. At some later point in time a signal may be received, host CPU wakeup received 402. If the signal received is not a request to wake up the host CPU then the host CPU continues to wait for a wake up signal, host CPU wakeup received 402. If the signal received is to wakeup the host CPU then the host CPU is awakened, wakeup host CPU 404. After the host CPU is awakened, wakeup host CPU 404, a check is made to see if there is a request to boot the main operating system, boot main OS 406. If there is a request to boot the main OS then the main OS is booted, boot main OS 408. Once the main OS is booted, boot main OS 408, it is to be understood that the main OS would then function per its design.

If there is no request to boot the main OS, then a check is made to see if there is subsystem code to execute 410. If there is no subsystem code to execute 410, then in this example embodiment, return host CPU to prior state 412, and continue to wait for a wakeup signal, host CPU wakeup received 402. Returning the host CPU to the prior state is to be understood to place it into an operational mode such that it is capable of responding to a wakeup request, host CPU wakeup received 402. This prior state need not be identical in every respect or aspect to a state before receiving a wakeup request. For example, prior to receiving a wakeup request, the host CPU may have been in a deep sleep mode, with memory and cache having certain contents and in a first power state. Returning the host CPU to a prior state, in which it is capable of receiving a host CPU wakeup signal, may be for example, a limited sleep mode with the memory and cache having different contents and in a second power state. That is, for example, the host CPU may keep track of the number of times that it has been awakened and not executed subsystem code by altering a memory location and then entering a limited sleep mode.

If there is a request to execute subsystem code, subsystem code to execute 410, then subsystem code is executed and the host CPU is returned to a prior state, execute subsystem code and then return host CPU to prior state 414. Again, the prior state, as discussed above need not be identical to either the pre-wakeup signal state (host CPU wakeup received 402) or the state of the situation where subsystem code is not executed (return host CPU to prior state 412). For example, the host CPU may also keep track of the number of times that it has been awakened and has executed subsystem code by altering a different memory location and then entering a different sleep mode.

Figure 5:
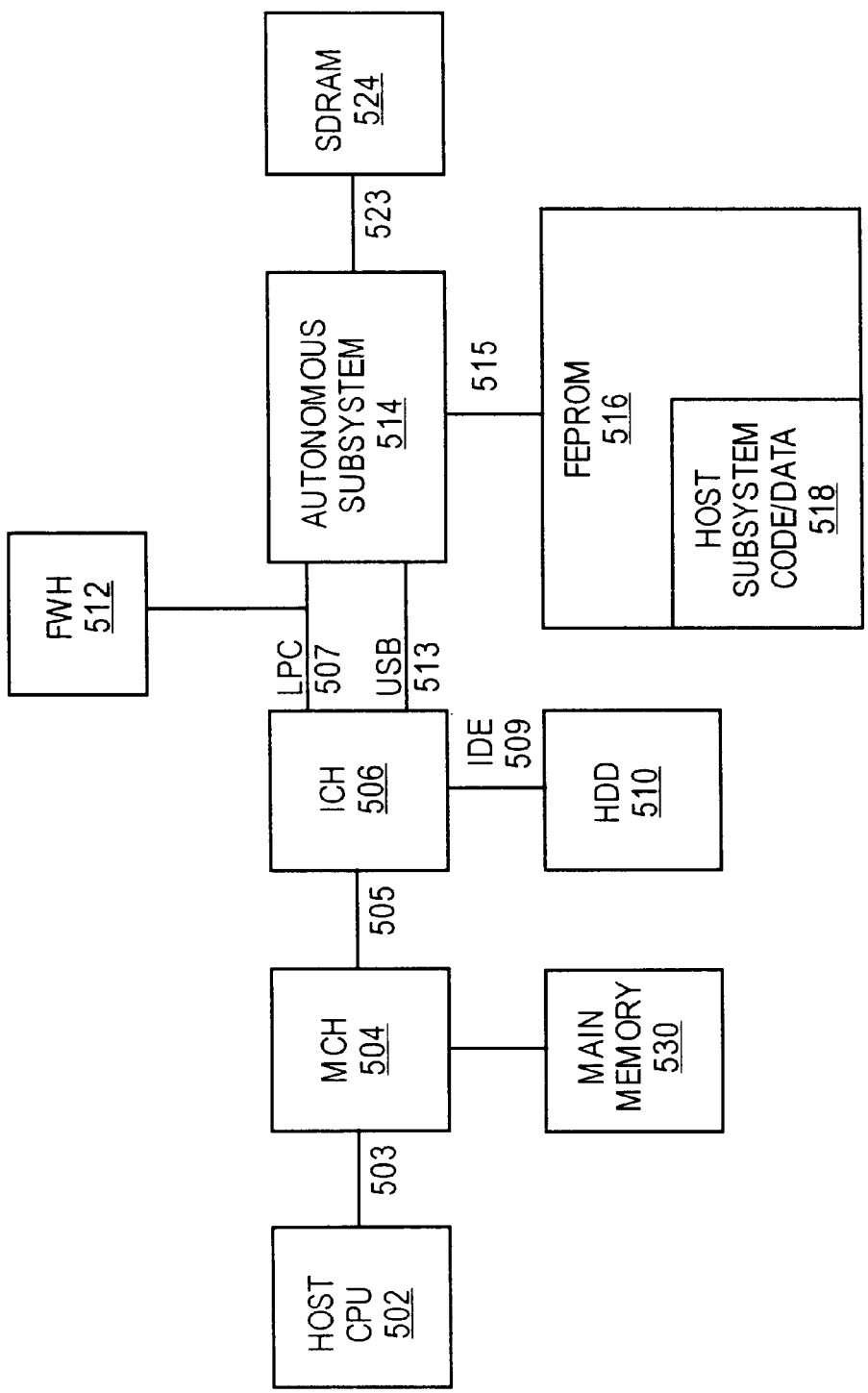
FIG. 5 is a block diagrams illustrating an embodiment of the present invention.

FIG. 5 illustrates one possible system architecture for embodiment of the present invention. A host central processing unit (CPU) 502 is coupled via link 503 to a memory controller hub (MCH) 504. The MCH 504 is coupled via link 505 to an input/output controller hub (ICH) 506, and via link 529 to a main memory 530. The ICH 506 is coupled to a hard disk drive (HDD) 510 via an integrated drive electronics (IDE) 509 link. The ICH 506 is also coupled to the autonomous subsystem 514 via a universal serial bus (USB) 513 link. Additionally the ICH 506 is coupled via a low pin count (LPC) 507 link to a firmware hub (FWH) 512, and the autonomous subsystem 514. The autonomous subsystem 514 is coupled to subsystem memory 524 via link 523. The autonomous subsystem 514 is coupled to a flash electrically programmable read only memory (FEPROM) 516 via link 515. It should be noted that the FEPROM 516 has some memory locations that are used for host subsystem code and/or data 518.

One possible example of operation using the embodiment of the invention as illustrated in FIG. 5 is as follows. The host CPU 502 is initially in a powered down state and receives a signal to wakeup. The host CPU 502 then begins executing code that results in the setting up of the MCH 504, and the ICH 506 such that accesses to the autonomous subsystem 514 are possible. Thus, the autonomous subsystem 514 resources are mapped for accessing by the host CPU 502. Additionally, the host CPU 502 executes code that transfers the host subsystem code and/or data 518 located in the FEPROM 516 into, for example, the subsystem memory 524. The host CPU 502 may then power down entering a lower power state, for example, a sleep state, while at the same time, the autonomous subsystem 514 and subsystem memory 524 may still be alive and active.

Referring again to FIG. 5, in this example, assume that autonomous subsystem 514 is still active and operational. Assume that autonomous subsystem 514 which may be, for example, a wireless communication device, receives data transmissions that it stores into subsystem memory 524. At some later point in time the subsystem memory 524 may be nearing its storage capacity and the contents of the subsystem memory 524 should be stored to the hard disk drive (HDD) 510. The host CPU 502 receives a signal to wakeup. The signal to wakeup the host CPU 502 may come from a variety of sources and is not necessary to the understanding of the present invention. After the host CPU 502 wakes up, it may check to see if there is subsystem code to execute. In this example, there is subsystem code in the subsystem memory 524. The host CPU 502 then begins executing code that results in the setting up of the MCH 504, and the ICH 506 such that accesses to the subsystem memory 524 is possible. Thus, the subsystem memory 524 resources are mapped for accessing by the host CPU 502. The host CPU 502 may then execute the code from the subsystem memory 524, which may effect the transferring of the information in the subsystem memory 524 to the HDD 510. After this transfer is completed, the host CPU 502 may power down.

An alternative, would be subsystem code that when executed by the host CPU 502 would have another device, such as another subsystem effect the subsystem memory 524 to HDD 510 transfer. Yet another alternative, would be to have the host CPU 502 execute subsystem code that sets up a direct memory access (DMA) transfer and then have the host CPU 502 power down after receiving an interrupt indicating that the transfer from subsystem memory 524 to the HDD 510 was completed. One skilled in the art will appreciate that there are many other possibilities for the architecture as illustrated in FIG. 5, and that there are many other possible architectures. Also, the above example illustrated a one way transfer of information for illustrative purposes only. It is to be understood that bidirectional flow of data and/or information is possible.

It is also to be understood that if, for example as illustrated above, a transfer is effected without the use of the main operating system, that it may still be possible to set up memory structures, and constructs such that when the OS is again operational, the OS context is preserved. For example, the host CPU 502 before entering a lower power state may set up the OS structures as if a DMA transfer is to occur. This transfer may occur as in the example given above and if the subsystem code when executed preserves the proper data structures and information, then after the host CPU 502 wakes up and boots or resumes execution of the OS, the OS will operate as if it had never ceased operating. That is, the time spent in the lower power mode entered by the host CPU 502, where the main operating system was no longer being executed, may not affect the OS when the OS code is again being executed by the host CPU 502.

While in the above example, reference was made to the host subsystem code and/or data 518 being transferred to the subsystem memory 524, it is to be understood that the subsystem code and/or data may be stored anywhere. For example, it may be stored on the HDD 510, in the main memory 530, another subsystem, a server on the Internet, or even on the cache of the host CPU 502. For example, once the host CPU has mapped the autonomous subsystem 514 resources, the host CPU 502 may power down. Upon being awakened, the host CPU 502 after determining that subsystem code is to be executed may access the subsystem code residing within a memory accessible to the host CPU 502 by virtue of a prior and/or bootup mapping. This mapping mechanism may include, but is not limited to: enabling addressing and data transfer modes in devices such as the MCH 504, ICH 506, etc.; transferring memory contents; address translation; special addressing modes; memory offsets; interrupts; vectoring; etc.

The illustrated embodiments of the present invention are to be understood as applicable to a plurality of subsystems within a single and/or distributed system or systems. For example, in a single system, there may be a subsystem handling user input, from for example, a keyboard, while at the same time another subsystem is handling, for example, the transmission and reception of data via a wireless link. In the quest to conserve power these various subsystems may be in various stages of powering up and down, doing this asynchronously. For example, a keyboard subsystem may power up only when a key is being activated and may power down between keystrokes. Similarly, a communications subsystem may only power up when transmission or reception is necessary.

Likewise, the implementation of the present invention is to be understood as not precluding applicability to systems that may comply with industry standards or specifications. For example, one industry specification is the Advanced Configuration and Power Interface Specification (ACPI, Revision 2.0, published Jul. 27, 2000). The present invention, for example, may be implemented and used in concert with ACPI states S3, S4, and S5.

Thus, a method and apparatus for access to resources not mapped to an autonomous subsystem in a computer based system without involvement of the main operating system have been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method for accessing a subsystem, comprising:
receiving a wake request at a host central processing unit (CPU) that is in a sleep state;
booting-up the host CPU from the sleep state in response to the wake request, without loading a host CPU operating system (OS);
mapping the subsystem for access by the CPU;
mapping subsystem code into the host CPU's memory space;
receiving a subsystem request;
performing the subsystem request using the host CPU; and
returning the host CPU into the sleep state.

2. The method according to claim 1, wherein mapping the subsystem for access by the host CPU further is accomplished without using the host CPU operating system (OS).

3. The method according to claim 1, wherein mapping subsystem code into the host CPU's memory space further comprises using the host CPU operating system (OS).

4. The method according to claim 1, wherein returning the host CPU into the sleep state disables operation of the host CPU operating system (OS).

5. The method according to claim 1, wherein performing the subsystem request using the host CPU comprises executing on the host CPU the subsystem code mapped into the host CPU's memory space.

6. The method according to claim 1, wherein performing the subsystem request using the host CPU comprises performing the subsystem request on the host CPU without involvement of the host CPU operating system (OS).

7. A method comprising:
powering up a main processor in a computer based system;
executing a main operating system on the powered up main processor;
mapping, via the powered up main processor executing the main operation system, a subsystem's
resources in the computer based system;
mapping subsystem code into the main processor's code space;
powering down the main processor;
receiving a wake request at the main processor that is in a sleep state;
booting-up the main processor from the sleep state in response to the wake request, without loading a main processor operating system (OS);
receiving a subsystem request;
performing the subsystem request using the main processor; and
returning the main processor into the sleep state.

8. The method according to claim 7, wherein powering down the main processor ceases execution of the main operating system.

9. The method according to claim 7, wherein powering down the main processor does not shut down the subsystem.

10. A machine-readable medium having stored thereon instructions, which when executed by a processor, causes said processor to perform:
receiving a wake request at the processor that is in a sleep state;
booting-up the processor from the sleep state in response to the wake request, without loading a main operating system;
mapping a subsystem for access by the processor;
mapping subsystem code into the processor's memory space;
receiving a subsystem request;
performing the subsystem request using the processor; and
returning the processor into the sleep state.

11. The machine-readable medium according to claim 10, wherein mapping a subsystem for access by the processor comprises mapping a subsystem for access by the processor by executing bootup code on the processor.

12. The machine-readable medium according to claim 10, wherein performing the subsystem request using the processor comprises performing the subsystem request using the processor without executing the main operating system on the processor.

13. A system comprising:
a main system having a host processor capable of executing code of a main operating system when the host processor is in a first state;
a subsystem coupled to the main system and accessible by the host processor; and a storage device accessible by the main system having stored therein subsystem code;

wherein the host processor
receives a wake request when in a sleep state,
boots-up from the sleep state in response to the wake request, without loading a processor operating system (OS),
receives a subsystem request,
performs the subsystem request according to the subsystem code, and
returns to the sleep state.

14. An apparatus for accessing a subsystem, comprising:

means for receiving a wake request at a host central processing unit (CPU) that is in a sleep state;

means for booting-up the host CPU from the sleep state in response to the wake request, without loading a host CPU operating system (OS);

means for mapping the subsystem for access by the CPU;

means for mapping subsystem code into the host CPU's memory space;

means for receiving a subsystem request;

means for performing the subsystem request on the host CPU; and means for returning the host CPU into the sleep state.

15. The apparatus of claim 14, wherein means for performing the subsystem request on the host CPU comprises means for executing on the host CPU the subsystem code mapped into the host CPU's memory space.

16. The apparatus of claim 14, wherein means for performing the subsystem request on the host CPU comprises means for performing the subsystem request on the host CPU without involvement of the a host CPU operating system (OS).

17. A method, comprising:

allocating a main system's resources such that a first subsystem's resources are in communication with the main system;

placing the main system into a sleep state while the first subsystem is in an active state;

receiving a wake request at the main system that is in the sleep state;

booting-up the main system from the sleep state in response to the wake request, without loading a main operating system;

signaling the main system that a function needs to be performed for the first subsystem; and performing the function for the first subsystem.

18. The method according to claim 17, wherein performing the function for the first subsystem is substantially performed by a second subsystem resource.

19. The method according to claim 18, wherein the second subsystem resource is located in the first subsystem.

20. The method according to claim 17, wherein the sleep state includes state S3, state S4, and state S5 of the Advanced Configuration and Power Interface Specification (ACPI).

* * * * *

UNITED STATES PATENT AND TRADEMARK OFFICE
CERTIFICATE OF CORRECTION

PATENT NO. : 6,775,785 B1  Page 1 of 1
DATED : August 10, 2004
INVENTOR(S) : Hart et al.

It is certified that error appears in the above-identified patent and that said Letters Patent is hereby corrected as shown below:

Column 10,
Line 2, after "the", delete "a".

Signed and Sealed this

Fifteenth Day of March, 2005

JON W. DUDAS
*Director of the United States Patent and Trademark Office*